US012786411B2

(12) United States Patent
Wu et al.

(10) Patent No.: US 12,786,411 B2
(45) Date of Patent: Nov. 3, 2026

(54) METHODS AND SYSTEMS FOR POST-RECONSTRUCTION FILTERING

(71) Applicant: InterDigital VC Holdings, Inc., Wilmington, DE (US)

(72) Inventors: Shilin Wu, San Diego, CA (US); Philippe Hanhart, La Conversion (CH); Yuwen He, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 19/033,943

(22) Filed: Jan. 22, 2025

(65) Prior Publication Data

US 2025/0168350 A1 May 22, 2025

Related U.S. Application Data

(63) Continuation of application No. 17/437,377, filed as application No. PCT/US2020/021839 on Mar. 10, 2020, now abandoned.

(Continued)

(51) Int. Cl.

*H04N 19/132* (2014.01)
*H04N 19/159* (2014.01)

(Continued)

(52) U.S. Cl.

CPC ......... *H04N 19/132* (2014.11); *H04N 19/159* (2014.11); *H04N 19/176* (2014.11); *H04N 19/60* (2014.11); *H04N 19/80* (2014.11)

(58) Field of Classification Search

CPC .. H04N 19/132; H04N 19/159; H04N 19/176; H04N 19/60; H04N 19/80

See application file for complete search history.

(56) References Cited

U.S. PATENT DOCUMENTS 11,166,037 B2 11/2021 Chiang
2006/0078209 A1 4/2006 Kobayashi (Continued)

FOREIGN PATENT DOCUMENTS

CN 103283234 A 9/2013
CN 105874791 A 8/2016

OTHER PUBLICATIONS

International Search Report and Written Opinion of the International Searching Authority for PCT/US2020/021839, mailed May 15, 2020, 14 pages.

(Continued)

*Primary Examiner* — James T Boylan

(74) *Attorney, Agent, or Firm* — Klintworth & Rozenblat LLP

(57) ABSTRACT

Systems and methods are described for video coding using adaptive Hadamard filtering of reconstructed blocks, such as coding units. In some embodiments, where Hadamard filtering might otherwise encompass samples outside the current coding unit, extrapolated samples are generated for use in the filtering. Reconstructed samples from neighboring blocks may be used in the filtering where available (e.g. in a line buffer). In some embodiments, different filter strengths are applied to different spectrum components in the transform domain. In some embodiments, filter strength is based on position of filtered samples within the block. In some embodiments, filter strength is based on the prediction mode used to code the current block.

12 Claims, 13 Drawing Sheets

Related U.S. Application Data

(60) Provisional application No. 62/816,695, filed on Mar. 11, 2019.

(51) Int. Cl.

| | |
|---|---|
| ***H04N 19/176*** | (2014.01) |
| ***H04N 19/60*** | (2014.01) |
| ***H04N 19/80*** | (2014.01) |

(56) References Cited

U.S. PATENT DOCUMENTS

| | | | | |
|---|---|---|---|---|
| 2011/0097009 | A1 | 4/2011 | Chouly | |
| 2013/0294508 | A1 | 11/2013 | Song | |
| 2013/0343447 | A1 | 12/2013 | Chen | |
| 2015/0124869 | A1 | 5/2015 | Fu | |
| 2015/0195526 | A1 | 7/2015 | Zhu | |
| 2016/0255371 | A1 | 9/2016 | Heo | |
| 2019/0052875 | A1* | 2/2019 | Son | H04N 19/85 |
| 2019/0320200 | A1 | 10/2019 | Heo | |
| 2020/0059642 | A1 | 2/2020 | Kang | |
| 2020/0252653 | A1 | 8/2020 | Rusanovskyy | |
| 2021/0029353 | A1 | 1/2021 | Brandenburg | |
| 2021/0067784 | A1 | 3/2021 | Hu | |
| 2021/0127113 | A1* | 4/2021 | Stepin | H04N 19/117 |
| 2021/0152841 | A1 | 5/2021 | Hu | |
| 2021/0195232 | A1 | 6/2021 | Esenlik | |
| 2021/0211657 | A1 | 7/2021 | Ikonin | |
| 2022/0109833 | A1 | 4/2022 | Choi | |

OTHER PUBLICATIONS

Ikonin, Sergey, et. al., "CE1: Hadamard Transform Domain Filter (CE1-2)". Huawei Technologies Co., LTD, Joint Video Experts Team (JVET) of I-ITU SG 16 WP 3 and ISO/IEC JTC 1/SC 29/WG 11, JVET-N0478, Mar. 19-27, 2019.

Ikonin, Sergey, et. al., "CE1-related: Hadamard Transform Domain In-Loop Filter Also Using Bottom/Right Reconstructed Samples". Huawei Technologies Co., LTD, Joint Video Experts Team (JVET) of ITU-T SG 16 WP 3 and ISO/IEC JTC 1/SC 29/WG 11, JVET-N0479, Mar. 19-27, 2019.

Ikonin, Sergey, et. al., "Non-CE: Hadamard Transform Domain Filter". Huawei Technologies Co., LTD, Joint Video Experts Team (JVET) of ITU-T SG 16 WP 3 and ISO/IEC JTC 1/SC 29/WG 11, JVET-M0468, Jan. 9-18, 2019.

Chen, Huanbang, et. al., "Description of SDR, HDR and 360° video coding technology proposal by Huawei, GoPro, HiSilicon, and Samsung". Huawei, GoPro, HiSilicon, and Samsung Electronics, Joint Video Exploration Team (JVET) of ITU-T SG 16 WP 3 and ISO/IEC JTC 1/SC 29/WG 11, JVET-J0025-v2, Apr. 10-20, 2018.

International Preliminary Report on Patentability for PCT/US2020/021839 issued on Aug. 25, 2021, 10 pages.

Bross, et. al., "High Efficiency Video Coding (HEVC) Text Specification Draft 10 (for FDIS and Last Call)". Joint Collaborative Team on Video Coding (JCT-VC), Document No. JCTVC-L1003, Jan. 2013, 310 pages.

International Telecommunication Union, "Advanced Video Coding for Generic Audiovisual Services". Series H: Audiovisual and Multimedia System; Infrastructure of audiovisual services, Coding of moving video, ITU-T Recommendation H.264, ISO/IEC/MPEG 4 Part 10, Nov. 2007, 564 pages.

Segall, Andrew, et al., "Joint Call for Proposals on Video Compression with Capability beyond HEVC". Joint Video Exploration Team (JVET) of ITU-T SG 16 WP 3 and ISO/IEC JTC 1/SC 29/WG 11, JVET-H1002, Oct. 18-24, 2017 (28 pages).

Bross, Benjamin. "Versatile Video Coding (Draft 1)". Joint Video Experts Team (JVET) of ITU-T SG 16 WP 3 and ISO/IEC JTC 1/SC 29/WG 11, Document No. JVET-J1001-v2, 10th Meeting: San Diego, US, Apr. 10-20, 2018 (40 pages).

Chen, Jianle, et al. "Algorithm description for Versatile Video Coding and Test Model 3 (VTM 3)". Joint Video Experts Team (JVET) of ITU-T SG 16 WP 3 and ISO/IEC JTC 1/SC 29/WG 11, Document No. JVET-L1002-v1, 12th Meeting: Macao, CN, Oct. 3-12, 2018 (48 pages).

Chen, Jianle, et al. "Algorithm Description of Joint Exploration Test Model 7 (JEM 7)". Joint Video Exploration Team (JVET) of ITU-T SG 16 WP 3 and ISO/IEC JTC 1/SC 29/WG 11, Document No. JVET-G1001-v1, 7th Meeting: Torino, IT, Jul. 13-21, 2017 (51 pages).

Stepin, Victor, et al. "CE2 related: Hadamard Transform Domain Filter". Joint Video Experts Team (JVET) of ITU-T SG 16 WP 3 and ISO/IEC JTC 1/SC 29/WG 11, Document No. JVET-K0068-v3, 11th Meeting: Ljubljana, SI, Jul. 10-18, 2018 (5 pages).

Ikonin, Sergey, et al. "CE14: Hadamard transform domain filter (Test 3)". Joint Video Experts Team (JVET) of ITU-T SG 16 WP 3 and ISO/IEC JTC 1/SC 29/WG 11, Document No. JVET-L326-v3, 12th Meeting: Macao, CN, Oct. 3-12, 2018 (15 pages).

SMPTE Standard "VC-1 Compressed Video Bitstream Format and Decoding Process". The society of motion picture and television engineers, SMPTE 421M, 2006, (493 pages).

CHEN , Jianle, et. al., "Coding Tools Investigation for Next Generation Video Coding". ITU-Telecommunication Standardization Sector, Study Group 16, Contribution 806, COM16-C806, Jan. 2015, pp. 1-7.

Alshina, E., et. al., "Known Tools Performance Investigation for Next Generation Video Coding". ITU—Telecommunications Standardization Sector, Video Coding Experts Group (VCEG), SG16/Q6, VCEG-AZ05, Jun. 2015, 7 pages.

Karczewicz, M., et. al., "Report of AHG1 On Coding Efficiency Improvements". ITU—Telecommunications Standardization Sector, Video Coding Experts Group (VCEG), SG16/Q6, VCEG-AZ01, Jun. 2015, 2 pages.

Ohm, Jens-Rainer., et al., "Report of AHG on Future Video Coding Standardization Challenges". International Organization for Standardization, Coding of Moving Pictures and Audio, ISO/IEC JTC1/SC29/WG11 MPEG2014/M36782, Jun. 2015, 4 pages.

* cited by examiner

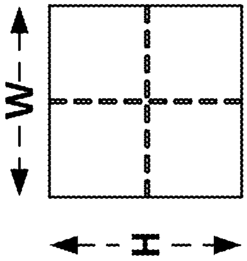
FIG.
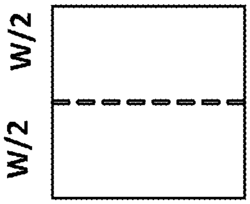
FIG.
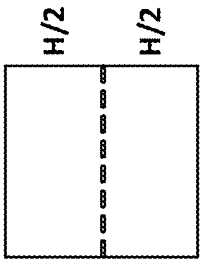
FIG.
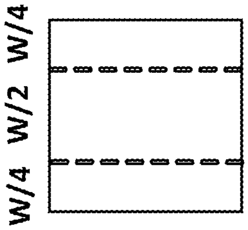
FIG.
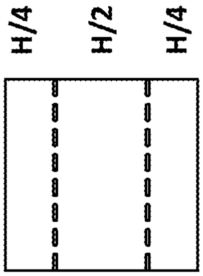
FIG.

METHODS AND SYSTEMS FOR POST-RECONSTRUCTION FILTERING

CROSS-REFERENCE TO RELATED APPLICATIONS

The present application is a continuation of U.S. patent application Ser. No. 17/437,377, filed Sep. 8, 2021, which is a national stage application under 35 U.S.C. § 371 of International Application No. PCT/US2020/021839, entitled "METHODS AND SYSTEMS FOR POST-RECONSTRUCTION FILTERING" filed on Mar. 10, 2020, which claims benefit under 35 U.S.C. § 119 (e) from U.S. Provisional Patent Application Ser. No. 62/816,695, entitled "METHODS AND SYSTEMS FOR POST-RECONSTRUCTION FILTERING," filed Mar. 11, 2019, which is hereby incorporated by reference in its entirety.

BACKGROUND

Video coding systems are widely used to compress digital video signals to reduce the storage need and/or transmission bandwidth of such signals. Among the various types of video coding systems, such as block-based, wavelet-based, and object-based systems, block-based hybrid video coding systems are the most widely used and deployed. Examples of block-based video coding systems include international video coding standards such as the MPEG1/2/4 part 2, H.264/MPEG-4 part 10 AVC, VC-1, and High Efficiency Video Coding (HEVC), which was developed by JCT-VC (Joint Collaborative Team on Video Coding) of ITU-T/SG16/Q.6/VCEG and ISO/IEC/MPEG.

The first version of the HEVC standard was finalized in October 2013 and offers approximately 50% bit-rate saving for equivalent perceptual quality compared to the prior generation video coding standard, H.264/MPEG AVC. Although the HEVC standard provides significant coding improvements over its predecessor, there is evidence that superior coding efficiency can be achieved with additional coding tools over HEVC. Based on that, both VCEG and MPEG started the exploration work of new coding technologies for future video coding standardization. In October 2015, ITU-T VCEG and ISO/IEC MPEG formed the Joint Video Exploration Team (JVET) to begin significant study of advanced technologies that could enable substantial enhancement of coding efficiency over HEVC. In the same month, a software codebase, called Joint Exploration Model (JEM) was established for future video coding exploration work. The JEM reference software was based on HEVC Test Model (HM) that was developed by JCT-VC for HEVC. Additional proposed coding tools may be integrated into the JEM software and tested using JVET common test conditions (CTCs).

In October 2017, a joint call for proposals (CfP) on video compression with capability beyond HEVC was issued by ITU-T and ISO/IEC. In April 2018, 22 CfP responses for the standard dynamic range category were received and evaluated at the 10-th JVET meeting, and a coding efficiency gain of about 40% over HEVC was demonstrated. Based on such evaluation results, the Joint Video Expert Team (JVET) launched a new project to develop the new generation video coding standard that is named Versatile Video Coding (VVC). In the same month, a reference software codebase, called WVC test model (VTM), was established for demonstrating a reference implementation of the VVC standard. For the initial VTM-1.0, most coding modules, including intra prediction, inter prediction, transform/inverse transform and quantization/de-quantization, and in-loop filters follow the existing HEVC design, with an exception that a multi-type tree based block partitioning structure is used in the VTM.

SUMMARY

Embodiments described herein include methods that are used in video encoding and decoding (collectively "coding").

In some embodiments, a plurality of samples in a current block of samples are reconstructed. A transform is applied to a first set of samples, including at least a subset of the reconstructed samples in the current block and at least one reconstructed sample outside the current block, to generate a set of original spectrum components. A filter is applied to at least one of the original spectrum components to generate a set of filtered spectrum components. An inverse of the transform is applied to the filtered spectrum components to generate a plurality of filtered samples corresponding to the first set of samples.

In some embodiments, the transform is a Hadamard transform, and the spectrum components are Hadamard spectrum components.

In some embodiments, the first set of samples further includes at least one extrapolated sample outside the current coding unit. Such embodiments may include generating an extrapolated sample value for the extrapolated sample based on the reconstructed samples in the current coding unit.

In some embodiments, the first set of samples further includes at least one extrapolated sample outside the current coding unit. Such embodiments may include generating an extrapolated sample value for the extrapolated sample based on the reconstructed samples in the current coding unit, wherein generating the extrapolated sample value is performed using at least one extrapolation method selected from the group consisting of: linear extrapolation, cubic extrapolation, bilinear extrapolation, and bi-cubic extrapolation.

In some embodiments, the current coding unit is intra coded, and the first set of samples further includes at least one predicted sample outside the current coding unit. In such embodiments, a predicted sample value may be generated for the predicted sample using an intra coding mode of the current coding unit.

In some embodiments, the current coding unit is inter coded, and the first set of samples further includes at least one predicted sample outside the current coding unit. In such embodiments, a predicted sample value may be generated for the predicted sample using a motion vector of the current coding unit.

In some embodiments, the current coding unit is inter coded, and the first set of samples further includes at least one predicted sample outside the current coding unit. In such embodiments, a predicted sample value may be generated for the predicted sample using a rounded version of the motion vector of the current coding unit.

In some embodiments, the first set of samples further includes at least one padded sample outside the current coding unit. In such embodiments, the value of a reconstructed sample adjacent to the padded sample may be used as a padded sample value for the padded sample.

In some embodiments, the first set of samples includes at least sixteen samples.

In some embodiments, applying a filter to at least one of the original Hadamard spectrum components includes determining $$F(i,\sigma)=\frac{R(i)^2}{R(i)^2+m*\sigma^2}*R(i)$$

where R(i) is an original Hadamard spectrum component and F(i, σ) is the corresponding filtered Hadamard spectrum component.

In some embodiments, the filtered samples are stored in a decoded picture buffer.

In additional embodiments, encoder and decoder systems are provided to perform the methods described herein.

Some embodiments include at least one processor configured to perform any of the methods described herein. In some such embodiments, a computer-readable medium (e.g. a non-transitory medium) is provided that stores instructions operative to perform any of the methods described herein.

Some embodiments include a computer-readable medium (e.g. a non-transitory medium) storing a video encoded using one or more of the methods disclosed herein.

An encoder or decoder system may include a processor and a non-transitory computer-readable medium storing instructions for performing the methods described herein.

One or more of the present embodiments also provide a computer readable storage medium having stored thereon instructions for performing filtering, encoding or decoding video data according to any of the methods described above. The present embodiments also provide a computer readable storage medium having stored thereon a bitstream generated according to the methods described above. The present embodiments also provide a method and apparatus for transmitting the bitstream generated according to the methods described above. The present embodiments also provide a computer program product including instructions for performing any of the methods described.

BRIEF DESCRIPTION OF THE DRAWINGS

FIGS. 3A-3E illustrate block partitions in a multi-type tree structure: quaternary partition (FIG. 3A); vertical binary partition (FIG. 3B); horizontal binary partition (FIG. 3C); vertical ternary partition (FIG. 3D); horizontal ternary partition (FIG. 3E).

FIG. 7A illustrates a diagonal grouping; FIG. 7B illustrates an L-shaped grouping.

EXAMPLE NETWORKS AND SYSTEMS FOR IMPLEMENTATION OF THE EMBODIMENTS

Figure 1A:
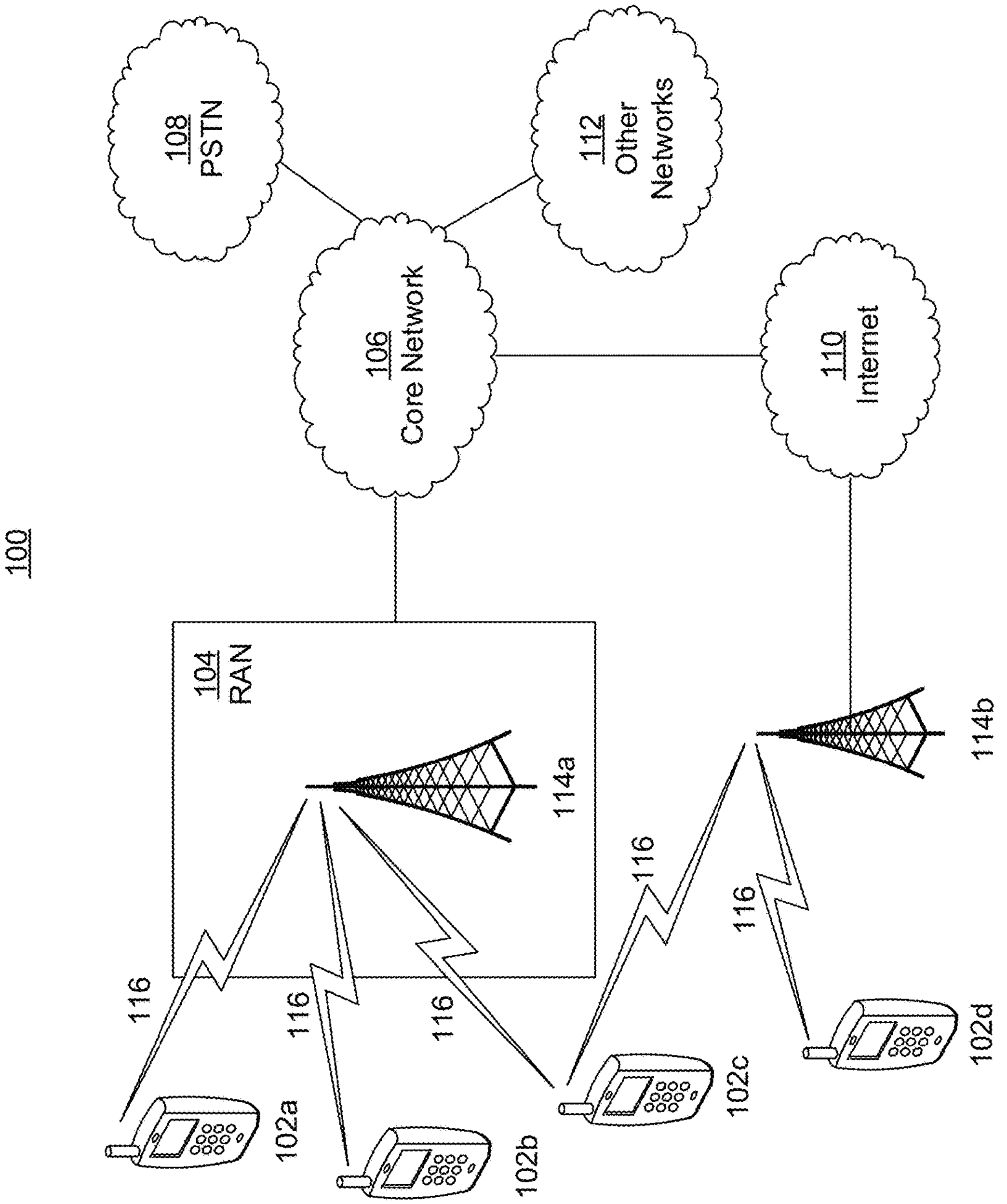
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
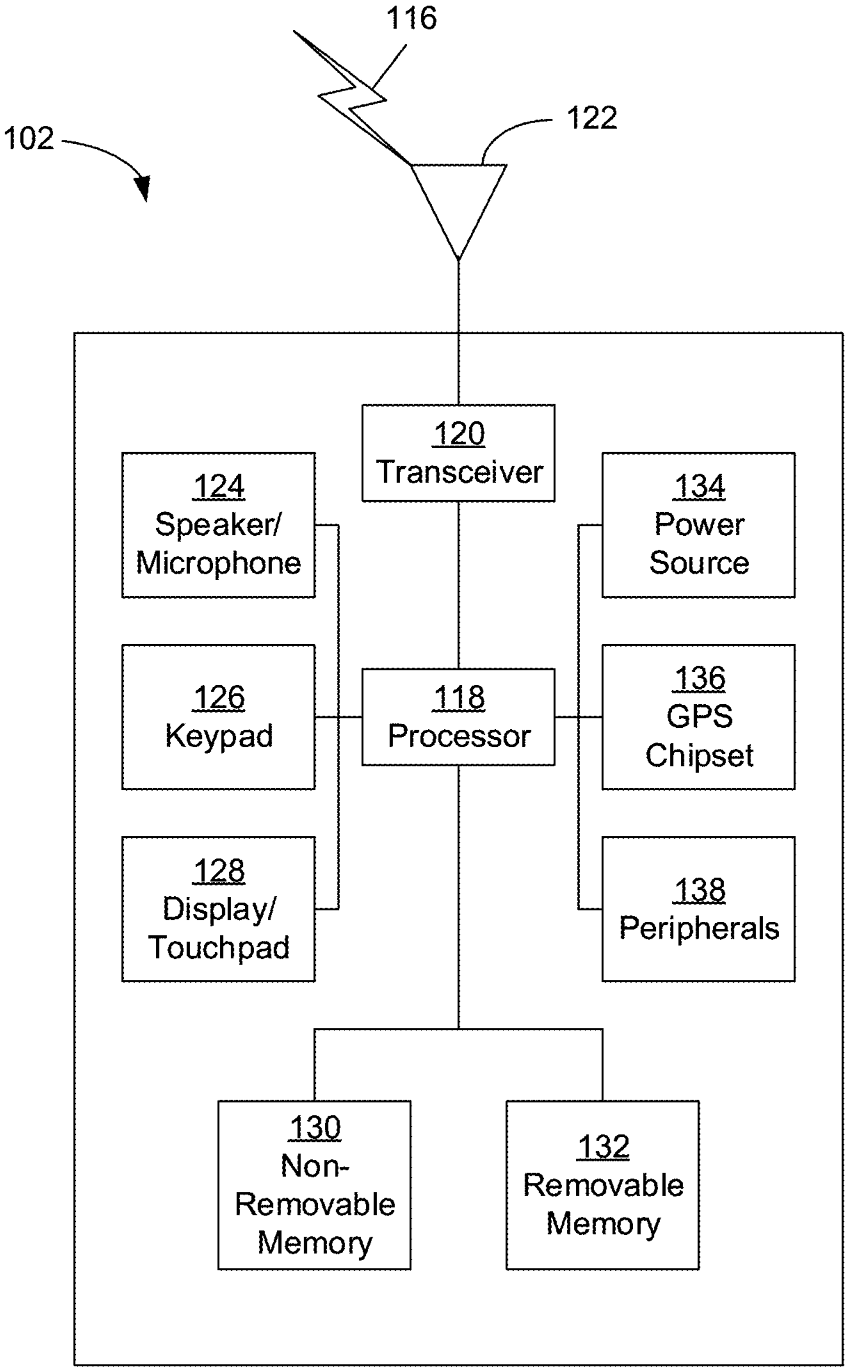
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Although the WTRU is described in FIGS. 1A-1B as a wireless terminal, it is contemplated that in certain representative embodiments that such a terminal may use (e.g., temporarily or permanently) wired communication interfaces with the communication network.

In representative embodiments, the other network 112 may be a WLAN.

In view of FIGS. 1A-1B, and the corresponding description, one or more, or all, of the functions described herein may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Example Systems

Figure 1C:
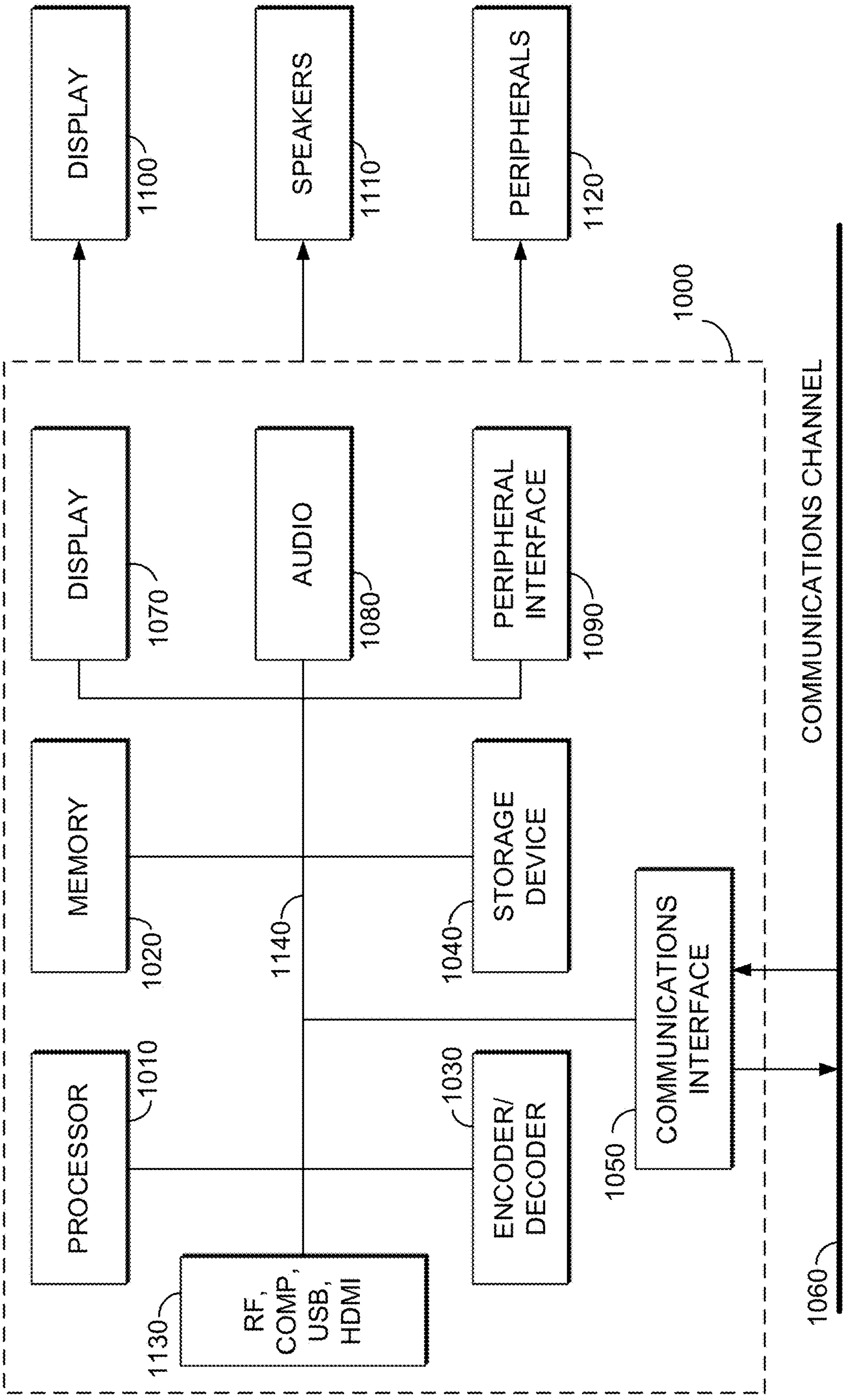
FIG. 1C is a functional block diagram of a system used in some embodiments described herein.

The embodiments described herein are not limited to being implemented on a WTRU. Such embodiments may be implemented using other systems, such as the system of FIG. 1C. FIG. 1C is a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or WVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 1C, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (12C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

DETAILED DESCRIPTION

Block-Based Video Coding.

Figure 2A:
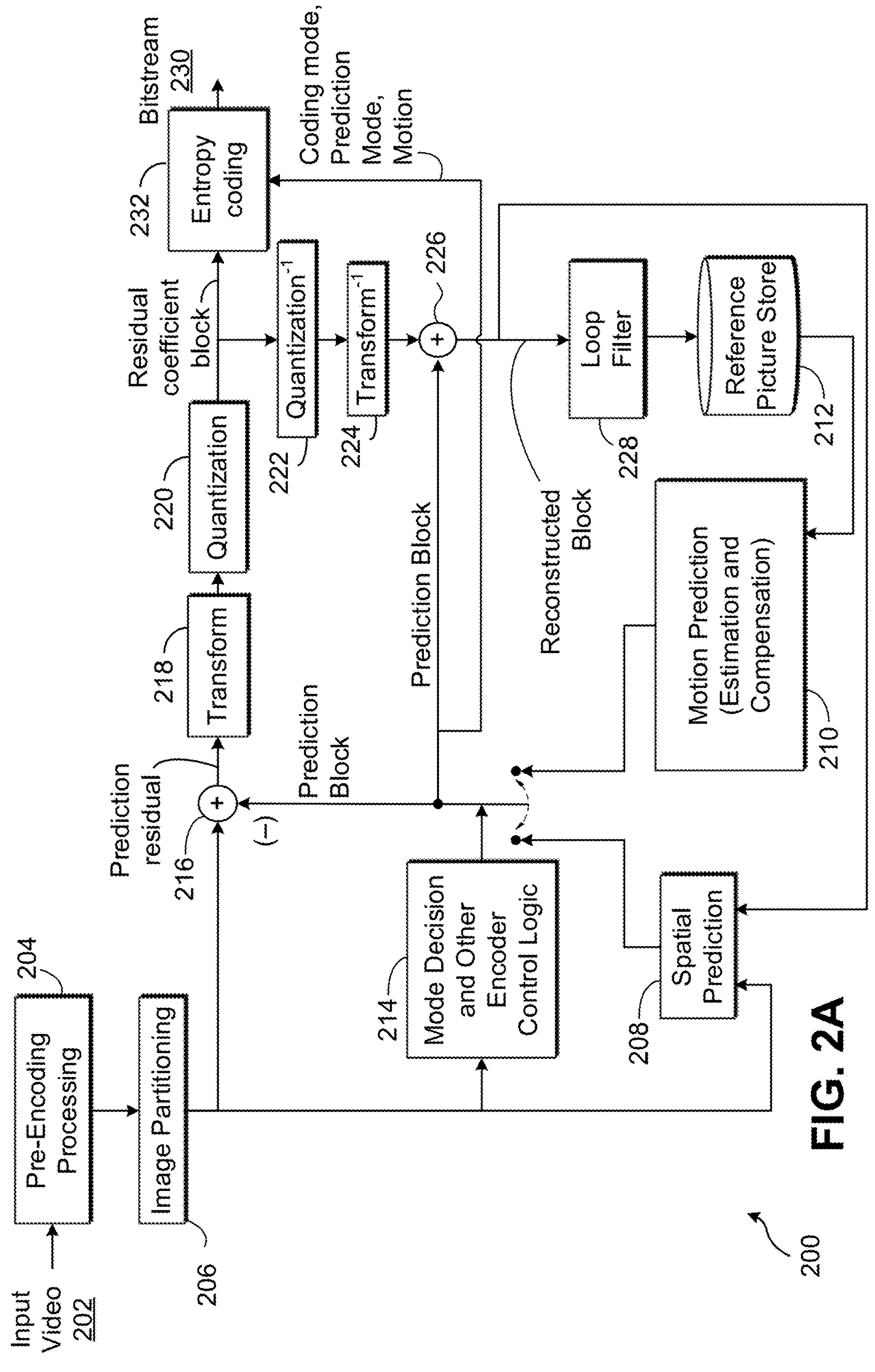
FIG. 2A is a functional block diagram of block-based video encoder, such as an encoder used for VVC.

Like HEVC, VVC is built upon the block-based hybrid video coding framework. FIG. 2A gives the block diagram of a block-based hybrid video encoding system 200. Variations of this encoder 200 are contemplated, but the encoder 200 is described below for purposes of clarity without describing all expected variations.

Before being encoded, a video sequence may go through pre-encoding processing (204), for example, applying a color transform to an input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

The input video signal 202 including a picture to be encoded is partitioned (206) and processed block by block in units of, for example, CUs. Different CUs may have different sizes. In VTM-1.0, a CU can be up to 128×128 pixels. However, different from the HEVC which partitions blocks only based on quad-trees, in the VTM-1.0, a coding tree unit (CTU) is split into CUs to adapt to varying local characteristics based on quad/binary/ternary-tree. Additionally, the concept of multiple partition unit type in the HEVC is removed, such that the separation of CU, prediction unit (PU) and transform unit (TU) does not exist in the VVC-1.0 anymore; instead, each CU is always used as the basic unit for both prediction and transform without further partitions. In the multi-type tree structure, a CTU is firstly partitioned by a quad-tree structure. Then, each quad-tree leaf node can be further partitioned by a binary and ternary tree structure. As shown in FIGS. 3A-3E, there are five splitting types: quaternary partitioning (FIG. 3A), vertical binary partitioning (FIG. 3B), horizontal binary partitioning (FIG. 3C), vertical ternary partitioning (FIG. 3D), and horizontal ternary partitioning (FIG. 3E).

In the encoder of FIG. 2A, spatial prediction (208) and/or temporal prediction (210) may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. A temporal prediction signal for a given CU may be signaled by one or more motion vectors (MVs) which indicate the amount and the direction of motion between the current CU and its temporal reference. Also, if multiple reference pictures are supported, a reference picture index may additionally be sent, which is used to identify from which reference picture in the reference picture store (212) the temporal prediction signal comes.

The mode decision block (214) in the encoder chooses the best prediction mode, for example based on a rate-distortion optimization method. This selection may be made after spatial and/or temporal prediction is performed. The intra/inter decision may be indicated by, for example, a prediction mode flag. The prediction block is subtracted from the current video block (216) to generate a prediction residual. The prediction residual is de-correlated using transform (218) and quantized (220). (For some blocks, the encoder may bypass both transform and quantization, in which case the residual may be coded directly without the application of the transform or quantization processes.) The quantized residual coefficients are inverse quantized (222) and inverse transformed (224) to form the reconstructed residual, which is then added back to the prediction block (226) to form the reconstructed signal of the CU. Further in-loop filtering, such as deblocking/SAO (Sample Adaptive Offset) filtering, may be applied (228) on the reconstructed CU to reduce encoding artifacts before it is put in the reference picture store (212) and used to code future video blocks. To form the output video bit-stream 230, coding mode (inter or intra), prediction mode information, motion information, and quantized residual coefficients are all sent to the entropy coding unit (108) to be further compressed and packed to form the bit-stream.

Figure 2B:
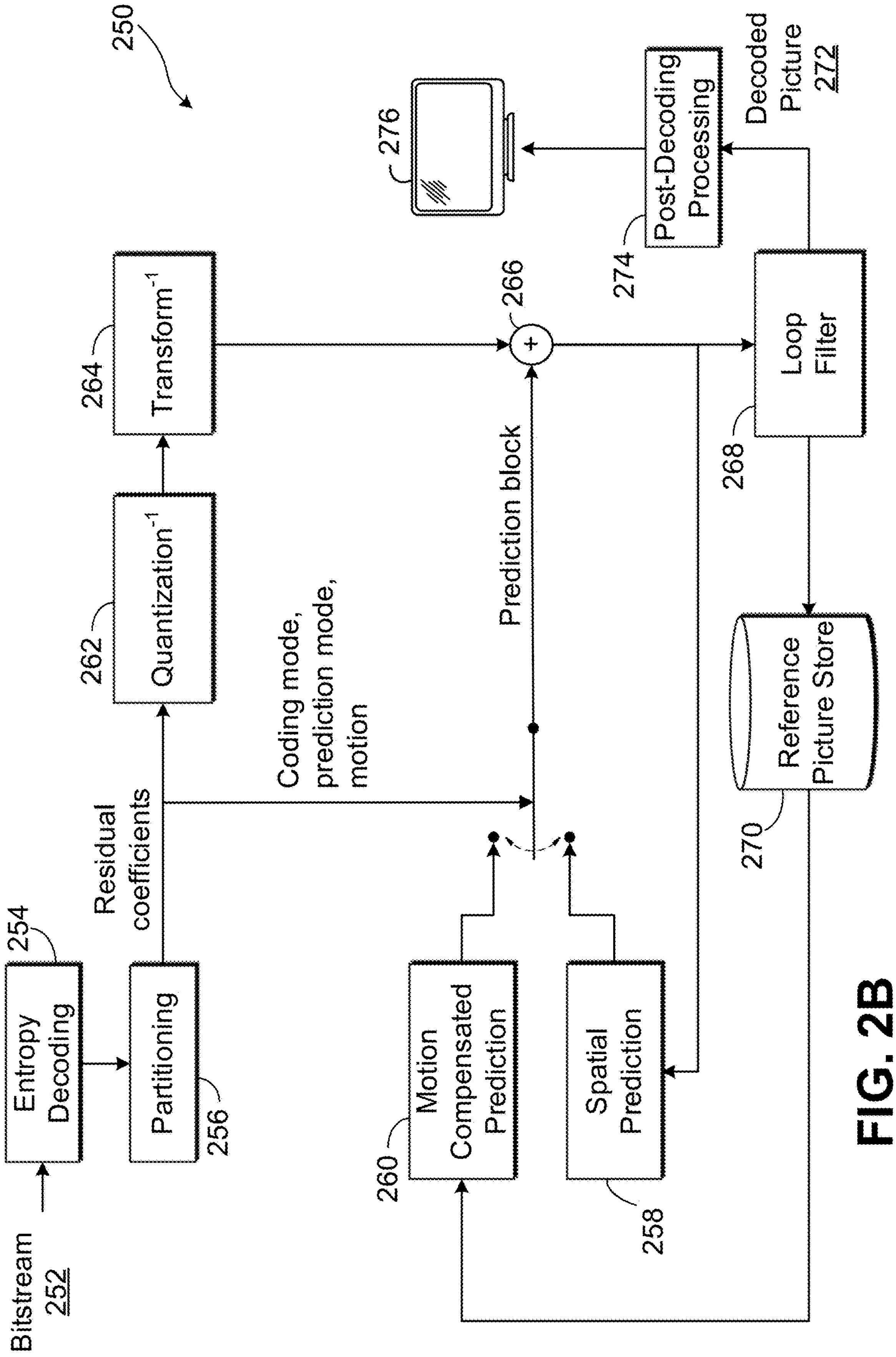
FIG. 2B is a functional block diagram of a block-based video decoder, such as a decoder used for VVC.

FIG. 2B gives a block diagram of a block-based video decoder 250. In the decoder 250, a bitstream is decoded by the decoder elements as described below. Video decoder 250 generally performs a decoding pass reciprocal to the encoding pass as described in FIG. 2A. The encoder 200 also generally performs video decoding as part of encoding video data.

In particular, the input of the decoder includes a video bitstream 252, which can be generated by video encoder 200. The video bit-stream 252 is first unpacked and entropy decoded at entropy decoding unit 254 to obtain transform coefficients, motion vectors, and other coded information. Picture partition information indicates how the picture is partitioned. The decoder may therefore divide (256) the picture according to the decoded picture partitioning information. The coding mode and prediction information are sent to either the spatial prediction unit 258 (if intra coded) or the temporal prediction unit 260 (if inter coded) to form the prediction block. The residual transform coefficients are sent to inverse quantization unit 262 and inverse transform unit 264 to reconstruct the residual block. The prediction block and the residual block are then added together at 266 to generate the reconstructed block. The reconstructed block may further go through in-loop filtering 268 before it is stored in reference picture store 270 for use in predicting future video blocks.

The decoded picture 272 may further go through post-decoding processing (274), for example, an inverse color transform (e.g. conversion from YCbCr 4:2:0 to RGB 4:4:4) or an inverse remapping performing the inverse of the remapping process performed in the pre-encoding processing (204). The post-decoding processing can use metadata derived in the pre-encoding processing and signaled in the bitstream. The decoded, processed video may be sent to a display device 276. The display device 276 may be a separate device from the decoder 250, or the decoder 250 and the display device 276 may be components of the same device.

Various methods and other aspects described in this disclosure can be used to modify modules of a video encoder 200 or decoder 250. Moreover, the systems and methods disclosed herein are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this disclosure can be used individually or in combination.

Hadamard Filtering.

Figure 4:
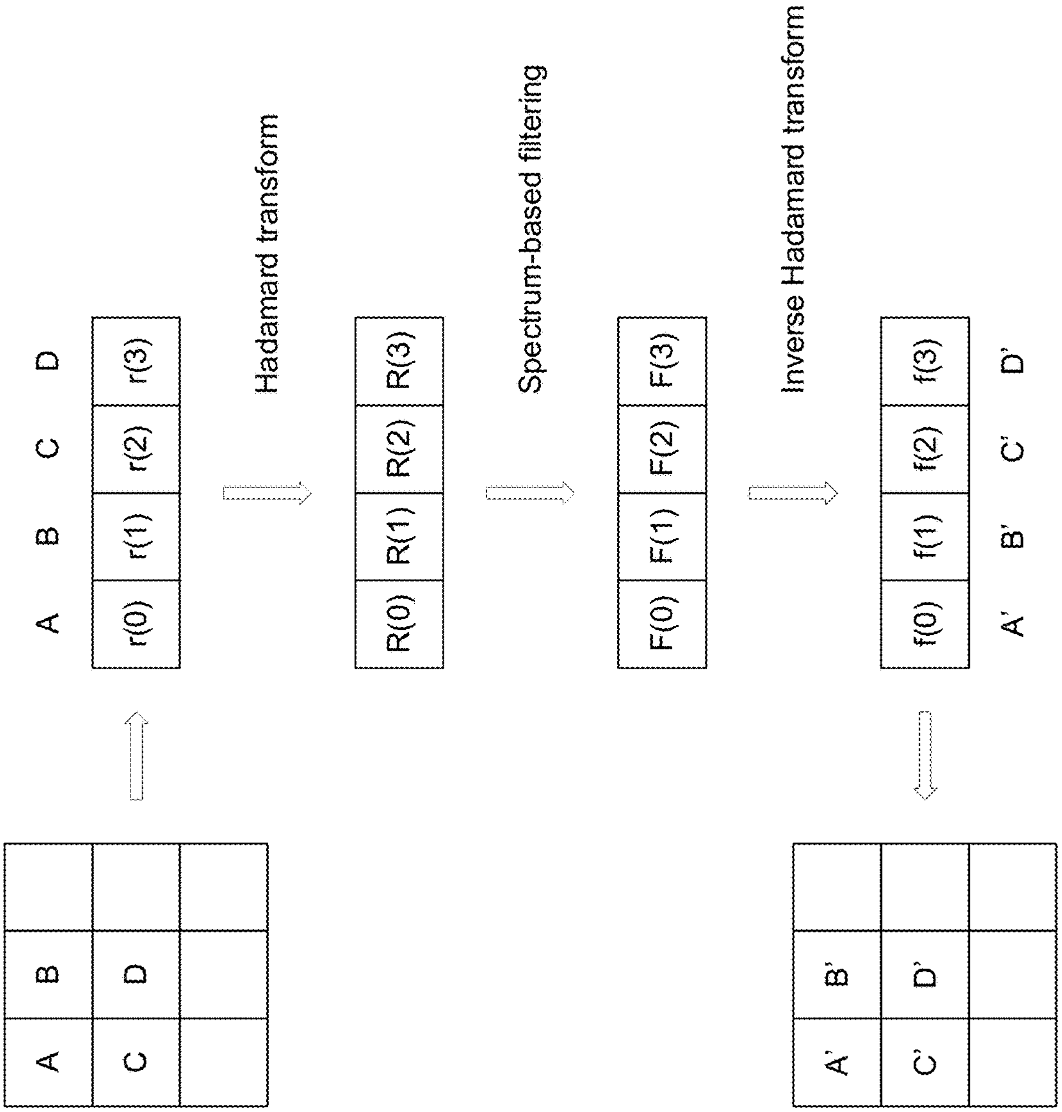
FIG. 4 illustrates Hadamard transform domain filtering. Sample A is the current sample; samples B,C,D are the neighboring samples.

Hadamard transform domain filtering has been proposed to improve coding performance in V. Stepin, S. Ikonin, R. Chernyak, J. Chen, "CE2 related: Hadamard Transform Domain Filter", JVET-K0068, July 2018; and S. Ikonin, V. Stepin, D. Kuryshev, J. Chen, "CE14: Hadamard transform domain filter (Test 3)", JVET-L326, October 2018. The filter is applied on a group of 2×2 reconstructed samples as depicted in FIG. 4. An example of a Hadamard filtering process is as follows:

1) Apply the 4-points (2×2) Hadamard transform to the four samples;
2) Apply spectrum-based filtering as follows:

$$F(i,\sigma)=\begin{cases} R(i) & \text{if } (i=0 \text{ or } |R(i)|>TH) \\ \dfrac{R(i)^2}{R(i)^2+m*\sigma^2}*R(i) & \text{otherwise} \end{cases} \quad (1)$$

where R(i) is the Hadamard spectrum component (i=0 . . . 3), m is a normalization constant, σ is a filtering parameter derived from the quantization parameter (QP), TH is a threshold of the magnitude of Hadamard coefficient to determine if filtering is applied or not. In JVET-K0068, JVET-L326, m is set to 4 and σ is derived as follows:

$$\sigma = 2.64 * 2^{(0.1296*(QP-11))} \quad (2)$$

Note that the average values of the four samples is kept constant as the DC component (i.e., R(0) is not filtered.

3) Apply the inverse 4-points Hadamard transform

The Hadamard transform domain filter is applied on overlapping groups of 2×2 samples to avoid discontinuity at 2×2 block boundaries, resulting in an equivalent 3×3 filtering.

Issues Addressed in Some Embodiments

The Hadamard transform domain filtering aims at improving coding efficiency by reducing the quantization noise in the reconstructed signal. However, it suffers from a few shortcomings. First, to avoid dependency on the neighboring CUs when filtering a CU, particularly for inter-predicted CUs, repetitive padding is used at the left and/or above CU boundaries, which may degrade the filtering efficiency. Second, although overlapping groups of 2×2 samples are used in filtering, the resulting kernel size is relatively small and very few samples are jointly filtered, which may reduce the filtering efficiency. Third, filtering is applied to all samples within a CU using the same filter strength, without any consideration of the position of the samples. Fourth, filtering is applied to all CUs using the same filter strength, without any consideration of the coding mode and/or prediction mode.

Overview of Example Embodiments

Example embodiments described herein may address one or more of the issues discussed above. Systems and methods are described for video coding using adaptive Hadamard filtering of reconstructed coding units. While examples are given with respect to filtering of coding units (CUs) the embodiments are not limited to filtering of CUs; instead, other blocks of samples can be filtered using techniques as described herein. Moreover, while specific examples are given with respect to filtering of components in the transform domain of a Hadamard transform, it should be noted that embodiments are also contemplated in which filtering is performed on components in the transform domain of other transforms, such as a discrete cosine transform or discrete Fourier transform. The transform may be an orthogonal transform.

In some embodiments, where Hadamard filtering might otherwise encompass samples outside the current coding unit, extrapolated samples are generated for use in the filtering. In some embodiments, different filter strengths are applied to different spectrum components in the transform domain. In some embodiments, filter strength is based on position of filtered samples within the coding unit. In some embodiments, filter strength is based on the prediction mode used to code the current coding unit.

Some embodiments may improve filtering efficiency. In some embodiments, instead of using repetitive padding at the left and/or above block boundaries (e.g. CU boundaries), extrapolation may be performed to extend samples outside the block (e.g. outside a CU). In some embodiments, predicted samples may be used to pad the extended block boundaries. Additionally, if reconstructed samples neighboring the block are available, those reconstructed samples may be used in the filtering. For example if the block is a CU is located at the top CTU row, then the reconstructed samples located above the CU may be available in the line buffer and may be used in the filtering. In some embodiments, to increase the filter kernel size and filter more samples jointly, a larger size Hadamard transform may be used, e.g., 16-points (i.e. 4×4) Hadamard transform. In some embodiments, for intra prediction modes, the filtering strength may be adjusted based on the distance between the samples to filter and the samples used in the intra prediction process. In some embodiments, the filtering strength may be adjusted based on the CU coding mode and/or prediction mode.

Inter Dependency Removal.

Before applying Hadamard transform domain filtering to a CU of size W×H, the CU may be first extended by one sample around the CU boundaries, resulting in (W+2)×(H+2) samples. The CU may be extended using repetitive padding, i.e., by copying the closest available sample. Then, the Hadamard filter may be applied on overlapping blocks of 2×2 samples.

In some embodiments, instead of or in addition to using repetitive padding at the CU boundaries, extrapolation is performed to extend the CU before applying Hadamard transform domain filtering. Different extrapolation methods, e.g., linear, cubic, bilinear, bi-cubic, etc. may be used. In this way, the filtering efficiency may be improved compared to using repetitive padding.

In another embodiment, inter prediction or intra prediction may be used to fill those extended boundary samples. For example, if the CU is intra coded, the CU reference samples may be used directly for the top and/or left CU boundaries. For the bottom and/or right CU boundaries, the padding samples may be derived from the CU reference samples or the CU reconstructed samples using the CU intra prediction mode. If the CU is inter coded, the padding samples may be derived using the current CU motion vector and its reference picture.

Motion compensated prediction may be used to fill those extended boundary samples, but it may involve interpolation, which generally calls for accessing more neighboring integer samples in the reference picture to perform interpolation. The computation and memory access bandwidth may be high. In some embodiments, to simplify motion compensation, the fractional position is rounded to its nearest integer position and the integer sample is fetched directly. In some embodiments, the padding samples Pad(x, y) at the top, bottom, left, and right boundaries may be derived as follows:

$$\mathrm{Pad}(x, y0-1) = RefPic(\mathrm{round}(x+MVx), \mathrm{round}(y0-1+MVy)),$$
$$\text{where } x \in [x0-1, x0+W];$$
$$\mathrm{Pad}(x, y0+H) = RefPic(\mathrm{round}(x+MVx), \mathrm{round}(y0+H+MVy)),$$
$$\text{where } x \in [x0-1, x0+w];$$
$$\mathrm{Pad}(x01, y) = RefPic(\mathrm{round}(x0-1+MVx), \mathrm{round}(y+MVy)),$$
$$\text{where } x \in [y0, y0+H-1];$$
$$\mathrm{Pad}(x0+W, y) = RefPic(\mathrm{round}(x+W+MVx), \mathrm{round}(y0-1+MVy)),$$
$$\text{where } x \in [y0, y0+H-1];$$

where (x0, y0) is the top left CU position, (MVx, MVy) is the CU motion vector, RefPic(x, y) refers to the reference sample at position (x, y) within the reference picture RefPic, and Round(x) is a function to round the variable x to its nearest integer value.

If the CU is bi-prediction coded, the padding sample from each reference may be derived first, and weighted averaging may be applied to the two padding samples to get a final padding sample.

Figure 5:
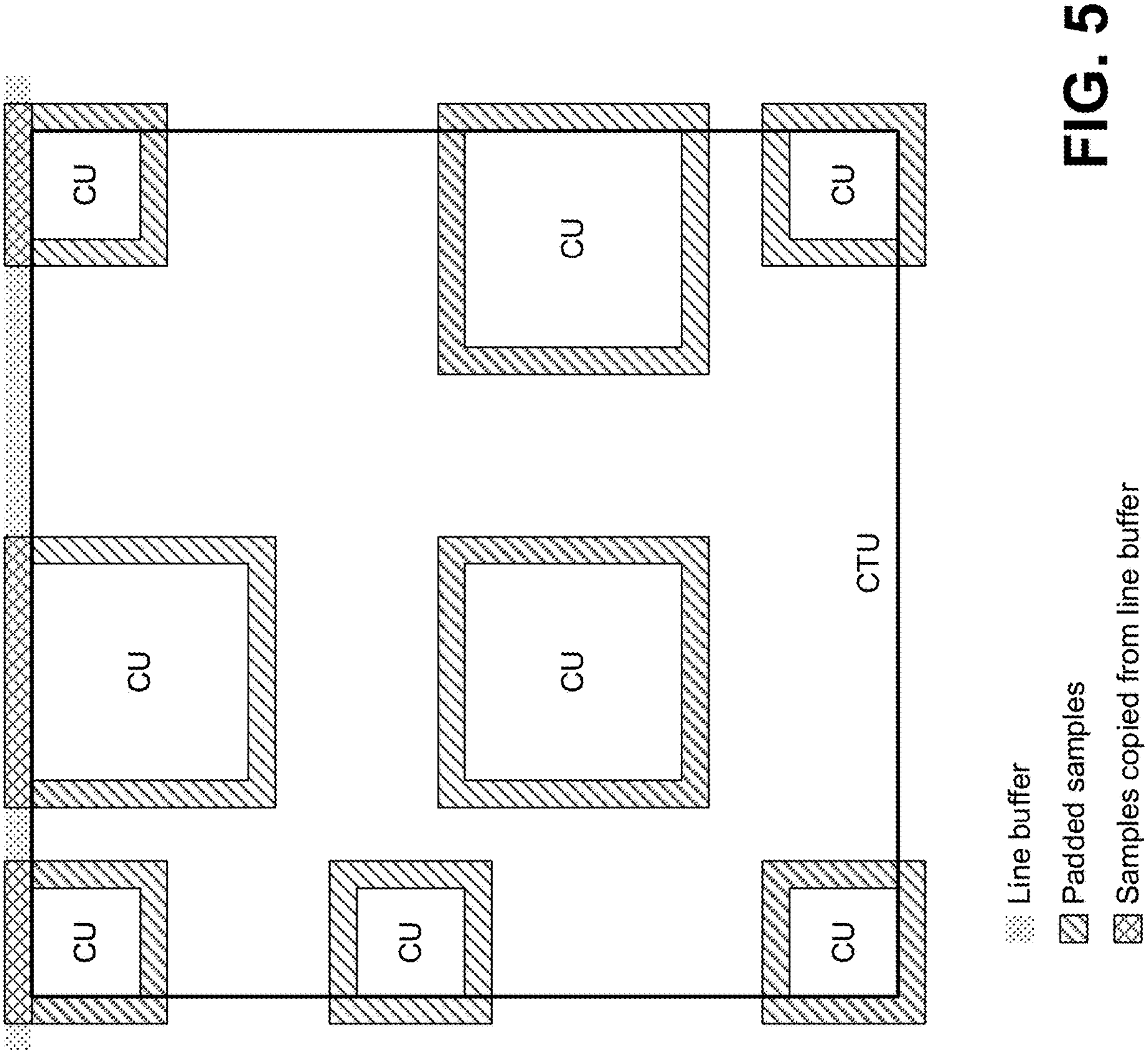
FIG. 5 illustrates use of samples available in a line buffer to extend the CU according to some embodiments.

If the CU is located at the top CTU row, then the reconstructed samples located above the CU may be available in the line buffer. In this case, instead of using repetitive padding or extrapolation for the top CU boundary, the above reconstructed samples available in the line buffer may be used directly to extend the CU, as depicted in FIG. 5. In this way, the filtering efficiency may be improved compared to using repetitive padding and/or extrapolation.

Larger Size Hadamard Transform Based Filtering.

Figure 6:
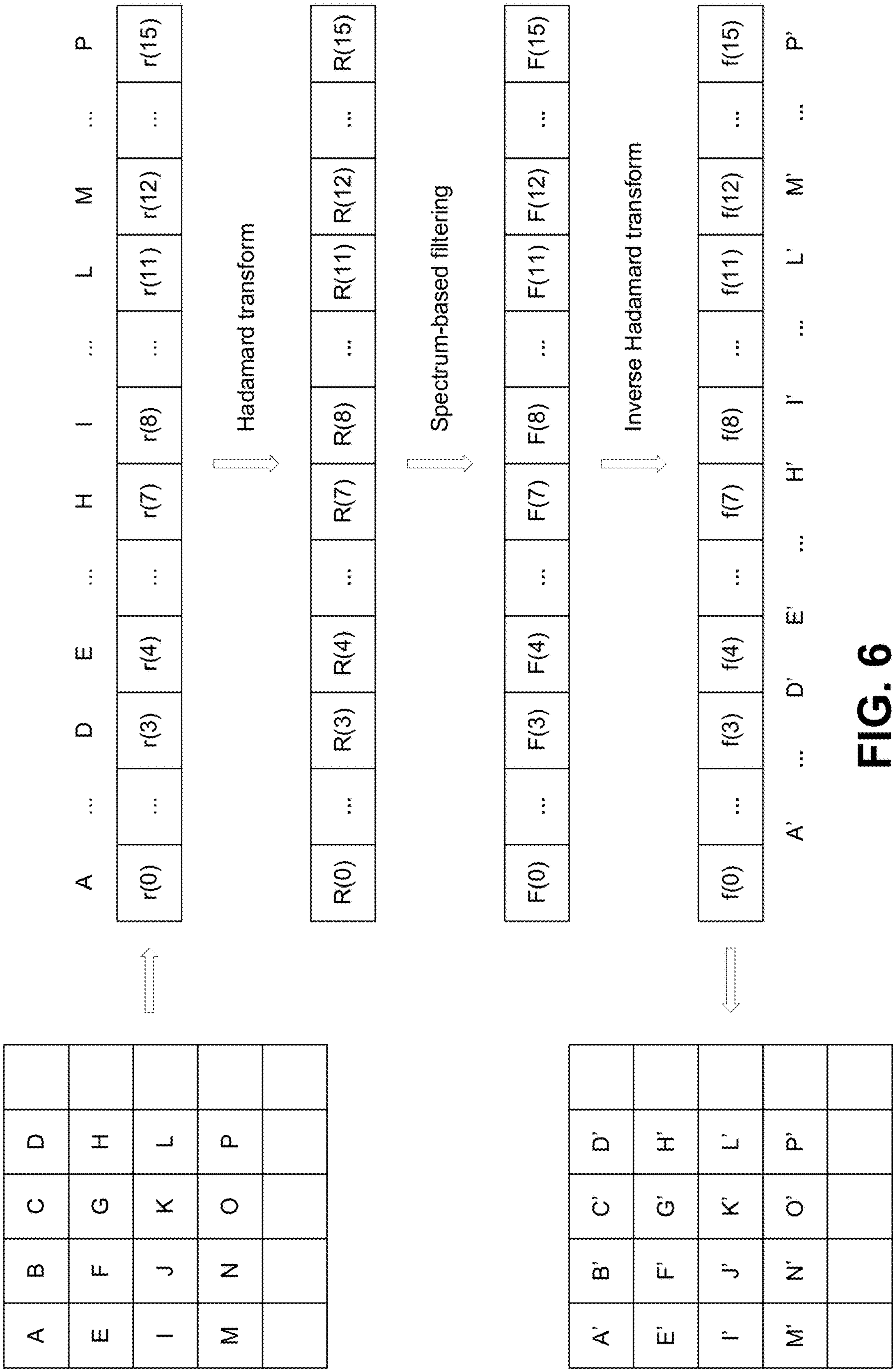
FIG. 6 illustrates a 16-points Hadamard transform domain filtering. Sample A is the current sample; samples B through P are neighboring samples.

In some embodiments, instead of the 4-points Hadamard transform, a larger size Hadamard transform is used, e.g., 16-points or 64-points Hadamard transform. The filtering process for the 16-points Hadamard transform is depicted in FIG. 6. The 16 samples may be scanned in different orders, e.g., using row-based or column-based scanning. A row-based scanning may be preferable for memory access as a whole row may be fetched in one memory access. The Hadamard transform with larger size may be implemented using a recursive smaller-size Hadamard transform. For example, the 16-points Hadamard transform may be implemented using recursive 4-points Hadamard transforms.

Figure 7B:
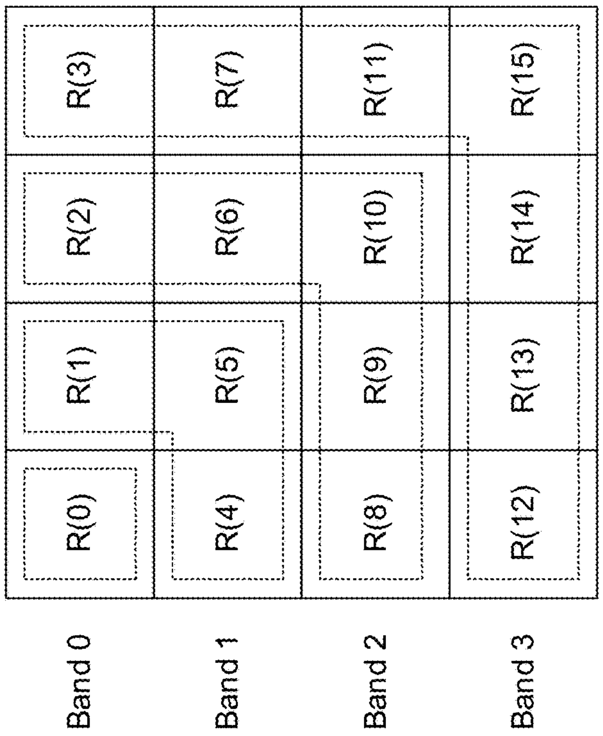
FIGS. 7A-7B illustrate frequency groupings in a 16-point Hadamard transform according to some embodiments.
Figure 7A:
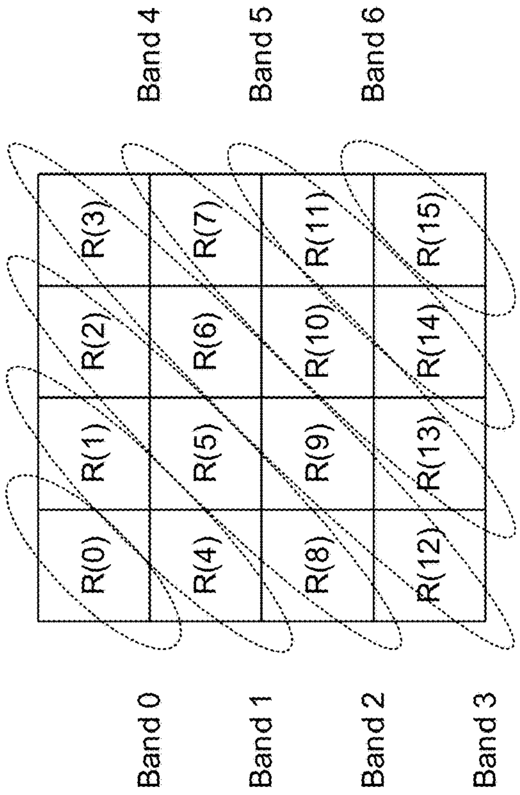

In some embodiments, for larger size Hadamard transform, spectrum-based filtering may be tuned for different frequency bands. For example, stronger filtering may be applied for higher frequency bands than for lower frequency bands. This may be achieved by changing the normalization constant m in Eq. (1) and/or modifying the filtering parameter σ in Eq. (2). For example, the normalization constant m may be set to a larger value for higher frequency bands than for lower frequency bands. Frequency bands may be determined by grouping coefficients in the Hadamard transform domain, e.g., using a diagonal grouping (illustrated in FIG. 7A) or an L-shaped grouping (illustrated in FIG. 7B).

Position-Dependent Hadamard Filtering.

For intra prediction modes, the prediction may be more accurate near the left and/or top CU boundaries as those areas may be closer from the reference samples used for prediction since the intra reference samples are always from top and left boundaries. However, the prediction may be less accurate near the bottom right part of the CU, as this area is further away from the reference samples. Since the Hadamard filter may be applied on a sample basis, it is proposed in some embodiments to apply a stronger filtering (e.g. higher values of σ) for these areas where the prediction accuracy may be lower and a weaker filtering (e.g. lower values of σ) for these areas where the prediction accuracy may be higher. For example, a stronger filtering may be applied for the bottom right part of the CU, and a weaker filtering may be applied to the left and/or top part of CU.

For CUs predicted using intra angular mode, the filtering strength may be determined based on the angular direction. The filtering strength may be adjusted based on the distance measured along the prediction direction between the samples to filter and the samples used in the angular prediction process. For example, if the angular mode is close to vertical, a stronger filtering may be applied in the region near the bottom CU boundary than that applied in the region near the top CU boundary. If the angular mode is close to horizontal, a stronger filtering may be applied in the region near the right CU boundary than that applied in the region near the left CU boundary. The filtering strength may be modified by changing the normalization constant m in Eq. (1) and/or modifying the filtering parameter σ in Eq. (2) based on the sample position within the CU.

Mode Dependent Hadamard Filtering.

In some embodiments, the filtering strength of a CU may be modified based on the CU coding mode. For example, inter-predicted CUs may be filtered using a different strength than intra-predicted CUs. For inter-predicted CUs, the filtering strength may be based on the CU coding mode, e.g., merge mode, and/or prediction mode, e.g., uni prediction, bi prediction, affine mode, etc. For example, the filtering strength may be weaker for bi-predicted CUs than for uni-predicted CUs, as bi-prediction mode may be more accurate than uni-prediction mode. If a CU is coded using sub-block mode, e.g., sub-block temporal motion vector prediction mode, or affine mode, the prediction may be more accurate than CU based prediction mode. In this case, the filtering strength may be weaker than for CU based prediction mode. The filtering strength may be modified by adjusting the normalization constant m in Eq. (1) and/or modifying the filtering parameter σ in Eq. (2) based on the CU coding mode and/or prediction mode.

Example Methods and Systems

Figure 10:
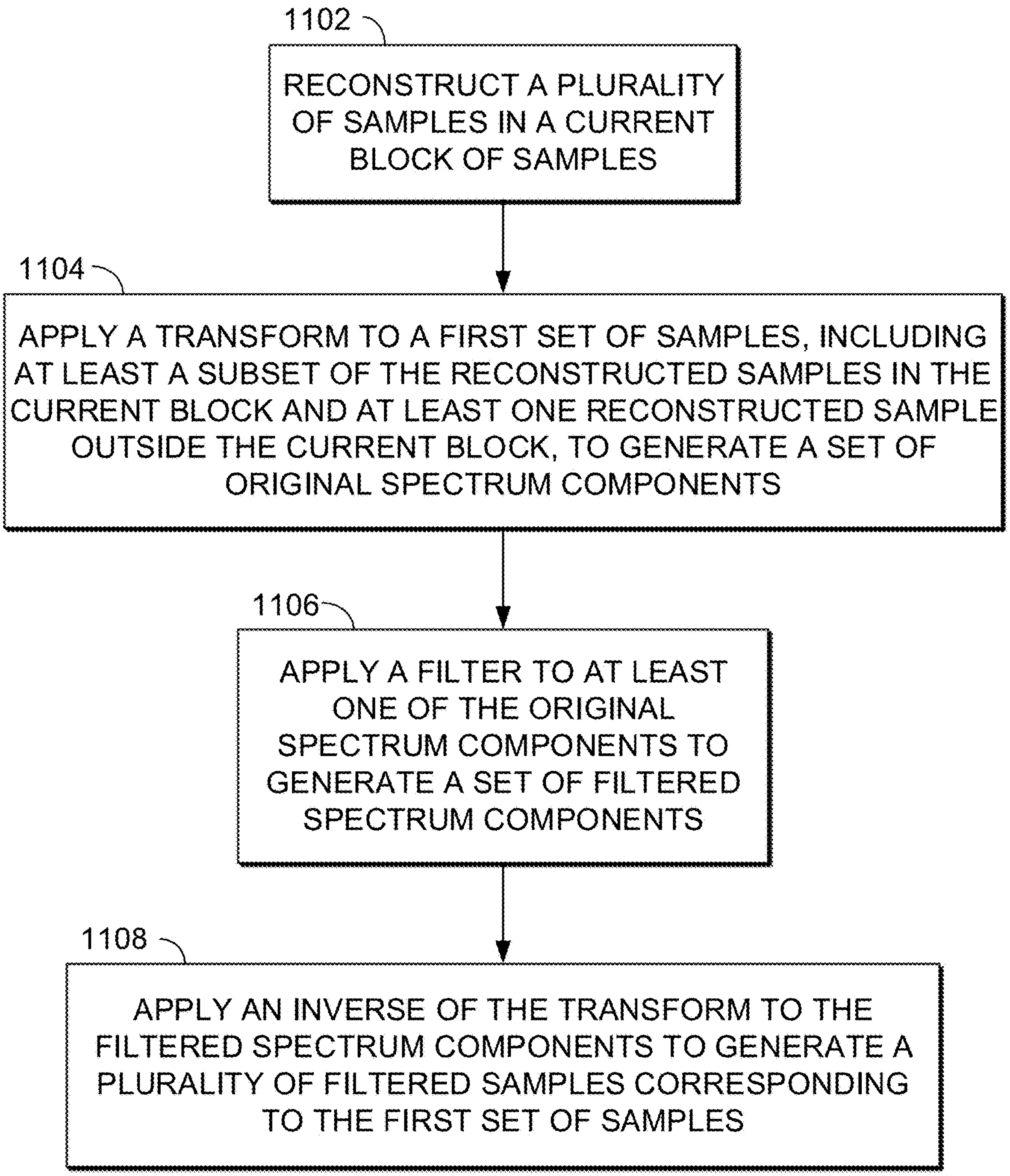
FIG. 10 is a flow chart illustrating a method performed in some embodiments.

As illustrated in FIG. 10, a method performed in some embodiments includes reconstructing a plurality of samples in a current block of samples (1102). A transform, such as a Hadamard transform, is applied (1104) to a first set of samples. The first set of samples includes at least a subset of the reconstructed samples in the current block and at least one reconstructed sample outside the current block. The application of the transform generates a set of original spectrum components. A filter is applied (1106) to at least one of the original spectrum components to generate a set of filtered spectrum components, which may be Hadamard spectrum components. An inverse of the transform is applied (1108) to the filtered spectrum components to generate a plurality of filtered samples corresponding to the first set of samples. In some embodiments, an apparatus is provided with one or more processors configured to perform the method of FIG. 10.

In some embodiments, an apparatus is provided with a module for reconstructing a plurality of samples in a current block of samples. Such a module may be implemented using, for example, summing module 226 (FIG. 2A) or 266 (FIG. 2B) A transform module, which may use a Hadamard transform, operates on a first set of samples. The first set of samples includes at least a subset of the reconstructed samples in the current block and at least one reconstructed sample outside the current block. The application of the transform generates a set of original spectrum components. A filter module operates on at least one of the original spectrum components to generate a set of filtered spectrum components, which may be Hadamard spectrum components. An inverse transform module operates on the filtered spectrum components to generate a plurality of filtered samples corresponding to the first set of samples. The transform module, filter module, and inverse transform module may be implemented using loop filter module 228 (FIG. 2A) or 268 (FIG. 2B).

In some embodiments, a device includes an apparatus according to any of the embodiments described herein, and at least one of (i) an antenna configured to receive a signal, the signal including data representative of the image, (ii) a band limiter configured to limit the received signal to a band of frequencies that includes the data representative of the image, or (iii) a display configured to display the image. In some such embodiments, the device may be a TV, a cell phone, a tablet, or an STB.

In some embodiments, a computer-readable medium is provided that includes instructions for causing one or more processors to perform the method of FIG. 10 or any other method described herein. The computer-readable medium may be a non-transitory medium.

A computer program product including instructions which, when the program is executed by one or more processors, causes the one or more processors to carry out the method of FIG. 10 or any other method described herein. The computer program product may be stored on a medium such as a non-transitory medium.

Coded Bitstream Structure.

Figure 8:
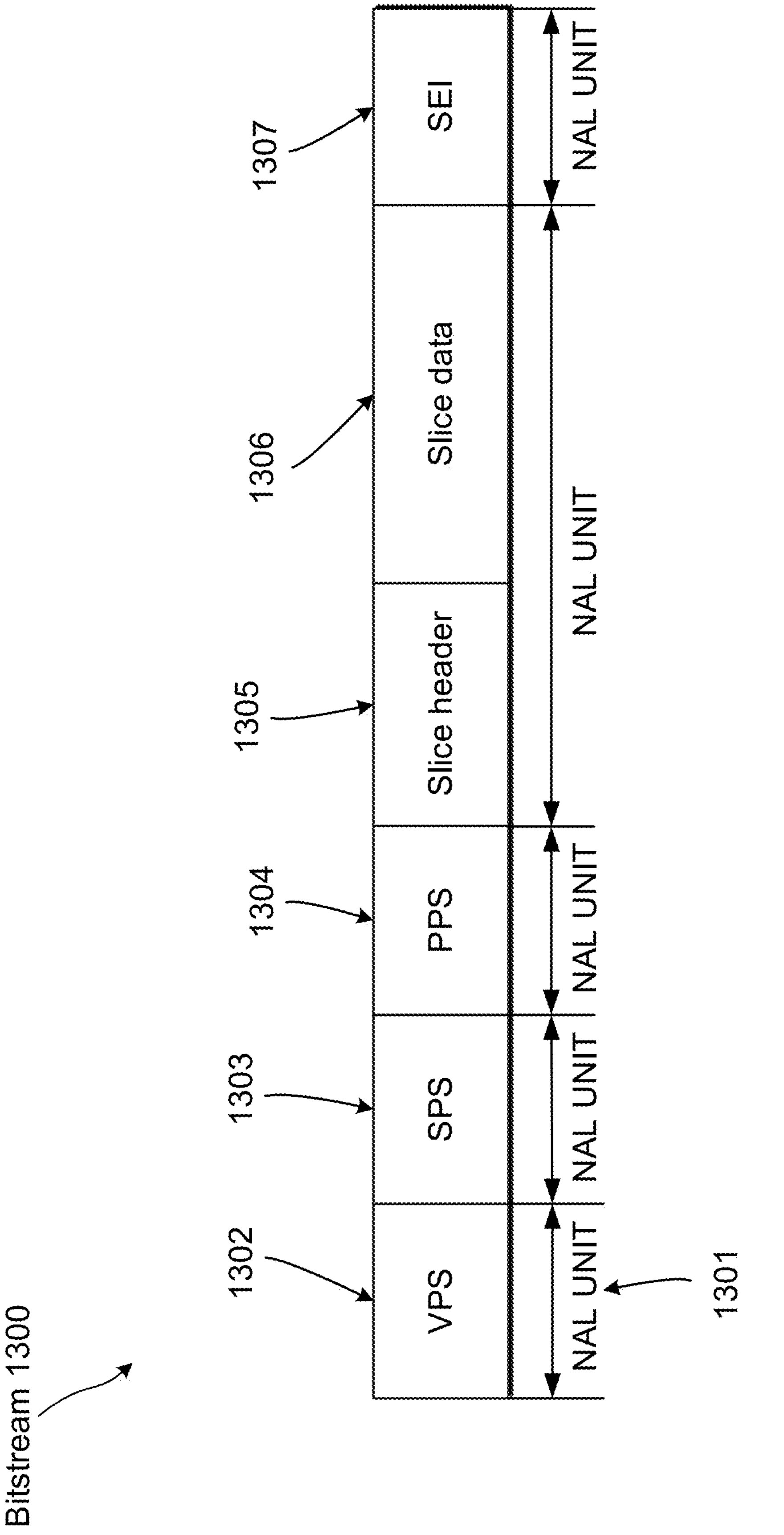
FIG. 8 is a diagram illustrating an example of a coded bitstream structure.

FIG. 8 is a diagram illustrating an example of a coded bitstream structure. A coded bitstream 1300 consists of a number of NAL (Network Abstraction layer) units 1301. A NAL unit may contain coded sample data such as coded slice 1306, or high level syntax metadata such as parameter set data, slice header data 1305 or supplemental enhancement information data 1307 (which may be referred to as an SEI message). Parameter sets are high level syntax structures containing essential syntax elements that may apply to multiple bitstream layers (e.g. video parameter set 1302 (VPS)), or may apply to a coded video sequence within one layer (e.g. sequence parameter set 1303 (SPS)), or may apply to a number of coded pictures within one coded video sequence (e.g. picture parameter set 1304 (PPS)). The parameter sets can be either sent together with the coded pictures of the video bit stream, or sent through other means (including out-of-band transmission using reliable channels, hard coding, etc.). Slice header 1305 is also a high level syntax structure that may contain some picture-related information that is relatively small or relevant only for certain slice or picture types. SEI messages 1307 carry the information that may not be needed by the decoding process but can be used for various other purposes such as picture output timing or display as well as loss detection and concealment.

Communication Devices and Systems.

Figure 9:
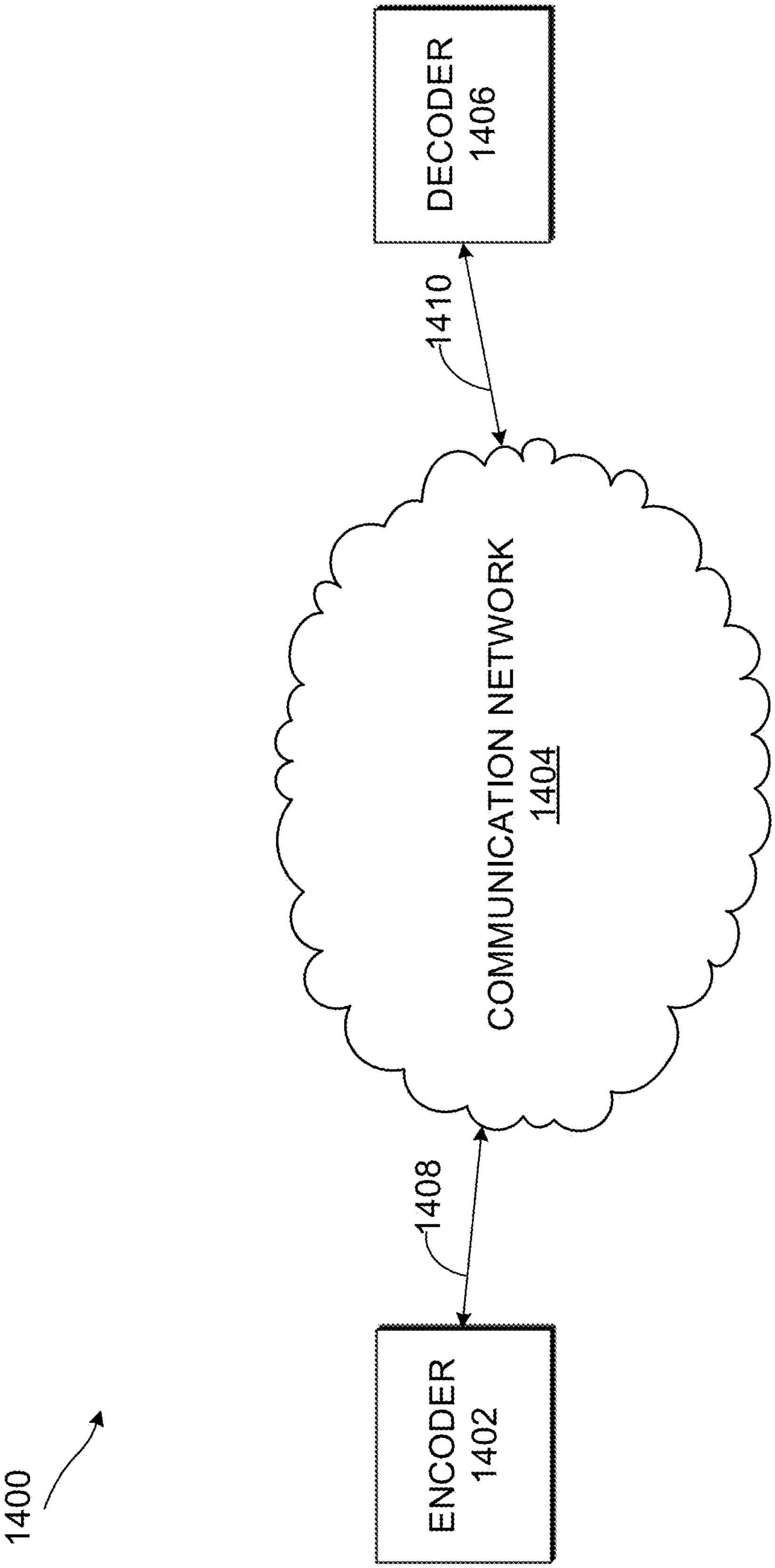
FIG. 9 is a diagram illustrating an example communication system.

FIG. 9 is a diagram illustrating an example of a communication system. The communication system 1400 may comprise an encoder 1402, a communication network 1404, and a decoder 1406. The encoder 1402 may be in communication with the network 1404 via a connection 1408, which may be a wireline connection or a wireless connection. The encoder 1402 may be similar to the block-based video encoder of FIG. 2A. The encoder 1402 may include a single layer codec (e.g., FIG. 2A) or a multilayer codec. The decoder 1406 may be in communication with the network 1404 via a connection 1410, which may be a wireline connection or a wireless connection. The decoder 1406 may be similar to the block-based video decoder of FIG. 2B. The decoder 1406 may include a single layer codec (e.g., FIG. 2B) or a multilayer codec.

The encoder 1402 and/or the decoder 1406 may be incorporated into a wide variety of wired communication devices and/or wireless transmit/receive units (WTRUs), such as, but not limited to, digital televisions, wireless broadcast systems, a network element/terminal, servers, such as content or web servers (e.g., such as a Hypertext Transfer Protocol (HTTP) server), personal digital assistants (PDAs), laptop or desktop computers, tablet computers, digital cameras, digital recording devices, video gaming devices, video game consoles, cellular or satellite radio telephones, digital media players, and/or the like.

The communications network 1404 may be a suitable type of communication network. For example, the communications network 1404 may be a multiple access system that provides content, such as voice, data, video, messaging, broadcast, etc., to multiple wireless users. The communications network 1404 may enable multiple wireless users to access such content through the sharing of system resources, including wireless bandwidth. For example, the communications network 1404 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like. The communication network 1404 may include multiple connected communication networks. The communication network 1404 may include the Internet and/or one or more private commercial networks such as cellular networks, WiFi hotspots, Internet Service Provider (ISP) networks, and/or the like.

Further Embodiments

In some embodiments, a video coding method includes: reconstructing a plurality of samples in a coding unit or other block of samples; generating extrapolated values for at least one extrapolated sample outside the coding unit; applying a Hadamard transform to a set of samples, including at least a subset of the reconstructed samples and at least one of the extrapolated samples, to generate a plurality of Hadamard spectrum components; applying spectrum-based filtering to the Hadamard spectrum components; applying an inverse of the Hadamard transform to the filtered Hadamard spectrum components to generate filtered samples; and replacing the subset of reconstructed samples in the coding unit with corresponding filtered samples to generate a filtered coding unit.

In some embodiments, generating extrapolated values is performed using at least one of the following extrapolation methods: linear, cubic, bilinear, and bi-cubic.

In some embodiments, the coding unit is intra coded, and generating extrapolated values is performed with intra prediction using an intra coding mode of the coding unit.

In some embodiments, the coding unit is inter coded, and generating extrapolated values is performed with inter prediction using a motion vector of the coding unit.

In some embodiments, the coding unit is inter coded, and performing the inter prediction comprises copying integer position samples from the reference picture.

In some embodiments, the coding unit is inter coded, and performing the inter prediction comprises rounding the motion vector to integer values.

In some embodiments, the coding unit is coded with bi-prediction, and generating extrapolated values is performed with bi-prediction using motion information of the coding unit.

In some embodiments, a video coding method includes: reconstructing a plurality of samples in a coding unit; applying a Hadamard transform to a set of samples, including at least a subset of the reconstructed samples and at least one sample in a line buffer adjacent to the coding unit, to generate a plurality of Hadamard spectrum components; applying spectrum-based filtering to the Hadamard spectrum components; applying an inverse of the Hadamard transform to the filtered Hadamard spectrum components to generate filtered samples; and replacing the subset of reconstructed samples in the coding unit with corresponding filtered samples to generate a filtered coding unit.

In some embodiments, a video coding method includes: reconstructing a plurality of samples in a coding unit; applying a Hadamard transform having at least sixteen points to a set of samples, including at least a subset of the reconstructed samples, to generate a plurality of Hadamard spectrum components; applying spectrum-based filtering to the Hadamard spectrum components; applying an inverse of the Hadamard transform to the filtered Hadamard spectrum components to generate filtered samples; and replacing the subset of reconstructed samples in the coding unit with corresponding filtered samples to generate a filtered coding unit.

In some embodiments, at least two different filter strengths are used for filtering of spectrum components other than the DC (R(0) component.

In some embodiments, the spectrum components are grouped into at least three frequency groups, and different filter strengths are applied to the spectrum components in different frequency groups.

In some embodiments, a filter strength applied to each of the spectrum components is a function of a frequency associated with the respective spectrum component. The filter strength may be a nondecreasing function of frequency.

In some embodiments, the filtering is performed according to $$F(i,\sigma)=\begin{cases} R(i) & \text{if } (i=0 \text{ or } |R(i)|>TH) \\ \dfrac{R(i)^2}{R(i)^2+m*\sigma^2}*R(i) & \text{otherwise} \end{cases}$$

where at least two different values of $m*\sigma$ are used for different spectrum components R(i).

In some embodiments, a video coding method includes reconstructing a plurality of samples in a coding unit; for each respective reconstructed sample, performing a filtering method comprising: applying a Hadamard transform to a set of samples, including the respective reconstructed sample, to generate a plurality of Hadamard spectrum components; applying spectrum-based filtering to the Hadamard spectrum components; applying an inverse of the Hadamard transform to the filtered Hadamard spectrum components to generate filtered samples; and replacing the subset of reconstructed samples in the coding unit with corresponding filtered samples to generate a filtered coding unit; wherein filtering strength is determined based at least in part on position of the respective reconstructed sample within the coding unit.

In some embodiments, filtering strength is higher for respective reconstructed samples toward the bottom right of the coding unit and lower for respective reconstructed samples toward the top left of the coding unit.

In some embodiments, the coding unit is coded with an intra angular mode, and filtering strength is further determined based at least in part on the angular mode.

In some embodiments, a video coding method includes: reconstructing a plurality of samples in a coding unit, where the coding unit is coded using a coding mode; applying a Hadamard transform to a set of samples, including at least a subset of the reconstructed samples, to generate a plurality of Hadamard spectrum components; applying spectrum-based filtering to the Hadamard spectrum components, wherein strength of the filtering is determined based at least in part on the coding mode; applying an inverse of the Hadamard transform to the filtered Hadamard spectrum components to generate filtered samples; and replacing the subset of reconstructed samples in the coding unit with corresponding filtered samples to generate a filtered coding unit.

In some embodiments, filtering strength is lower for a bi-prediction coding mode than for a uni-prediction coding mode.

In some embodiments, the filtered coding unit is stored in a decoded picture buffer.

In some embodiments, one or more of the foregoing methods are performed by an encoder.

In some embodiments, one or more of the foregoing methods are performed by an decoder.

Some embodiments include a processor configured to perform any of the methods described herein. In some such embodiments, a computer-readable medium (e.g. a non-transitory medium) is provided that stores instructions operative to perform any of the methods described herein.

Some embodiments include a computer-readable medium (e.g. a non-transitory medium) storing a video encoded using one or more of the methods disclosed herein.

This disclosure describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the disclosure or scope of those aspects. Indeed, all of the different aspects can be combined and interchanged to provide further aspects. Moreover, the aspects can be combined and interchanged with aspects described in earlier filings as well.

The aspects described and contemplated in this disclosure can be implemented in many different forms. While some embodiments are illustrated specifically, other embodiments are contemplated, and the discussion of particular embodiments does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present disclosure, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various numeric values may be used in the present disclosure, for example. The specific values are for example purposes and the aspects described are not limited to these specific values.

Embodiments described herein may be carried out by computer software implemented by a processor or other hardware, or by a combination of hardware and software. As a non-limiting example, the embodiments can be implemented by one or more integrated circuits. The processor can be of any type appropriate to the technical environment and can encompass one or more of microprocessors, general purpose computers, special purpose computers, and processors based on a multi-core architecture, as non-limiting examples.

Various implementations involve decoding. "Decoding", as used in this disclosure, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this disclosure, for example, extracting a picture from a tiled (packed) picture, determining an upsampling filter to use and then upsampling a picture, and flipping a picture back to its intended orientation.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions.

Various implementations involve encoding. In an analogous way to the above discussion about "decoding", "encoding" as used in this disclosure can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this disclosure.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. A mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this disclosure are not necessarily all referring to the same embodiment.

Additionally, this disclosure may refer to "determining" various pieces of information. Determining the information can include one or more of, for example, estimating the information, calculating the information, predicting the information, or retrieving the information from memory.

Further, this disclosure may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this disclosure may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items as are listed.

Also, as used herein, the word "signal" refers to, among other things, indicating something to a corresponding decoder. For example, in certain embodiments the encoder signals a particular one of a plurality of parameters for region-based filter parameter selection for de-artifact filtering. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

Implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

- A bitstream or signal that includes syntax conveying information generated according to any of the embodiments described.
- Creating and/or transmitting and/or receiving and/or decoding according to any of the embodiments described.
- A method, process, apparatus, medium storing instructions, medium storing data, or signal according to any of the embodiments described.
- A TV, set-top box, cell phone, tablet, or other electronic device that performs a filtering method according to any of the embodiments described.
- A TV, set-top box, cell phone, tablet, or other electronic device that performs a filtering method according to any of the embodiments described, and that displays (e.g. using a monitor, screen, or other type of display) a resulting image.
- A TV, set-top box, cell phone, tablet, or other electronic device that selects (e.g. using a tuner) a channel to receive a signal including an encoded image, and performs filtering according to any of the embodiments described.

A TV, set-top box, cell phone, tablet, or other electronic device that receives (e.g. using an antenna) a signal over the air that includes an encoded image, and performs filtering according to any of the embodiments described.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for decoding a video signal comprising:

reconstructing a plurality of samples in a current block of samples;

applying a Hadamard transform to a first set of samples, including at least a subset of the reconstructed samples in the current block and at least one reconstructed sample outside the current block, to generate a set of Hadamard spectrum components;

applying a filter to at least one of the spectrum components to generate a set of filtered spectrum components, wherein applying a filter to at least one of the Hadamard spectrum components comprises determining $$F(i,\sigma)=\frac{R(i)^2}{R(i)^2+m*\sigma^2}*R(i)$$

where R(i) is a Hadamard spectrum component and F(i, σ) is the corresponding filtered Hadamard spectrum component, m is a normalization constant, and σ is a filtering parameter, wherein the product $m*\sigma^2$ is different at different sample positions in the current block such that a strength of the filter is position-dependent, and wherein the normalization constant m is different at different sample positions in the current block; and applying an inverse of the transform to the filtered spectrum components to generate a plurality of filtered samples corresponding to the first set of samples.

2. The method of claim 1, wherein, according to the position-dependent filter strength, stronger filtering is applied at a bottom-right part of the current block and weaker filtering being applied to a left or top part of the current block.

3. The method of claim 1, wherein the filtering parameter σ is different at different sample positions in the current block.

4. An apparatus for decoding a video signal, the apparatus comprising one or more processors configured to perform:

reconstructing a plurality of samples in a current block of samples;

applying a Hadamard transform to a first set of samples, including at least a subset of the reconstructed samples in the current block and at least one reconstructed sample outside the current block, to generate a set of Hadamard spectrum components;

applying a filter to at least one of the spectrum components to generate a set of filtered spectrum components, wherein applying a filter to at least one of the Hadamard spectrum components comprises determining $$F(i,\sigma)=\frac{R(i)^2}{R(i)^2+m*\sigma^2}*R(i)$$

where R(i) is a Hadamard spectrum component and F(i, σ) is the corresponding filtered Hadamard spectrum component, m is a normalization constant, and σ is a filtering parameter, wherein the product $m*\sigma^2$ is different at different sample positions in the current block such that a strength of the filter is position-dependent, and wherein the normalization constant m is different at different sample positions in the current block; and applying an inverse of the transform to the filtered spectrum components to generate a plurality of filtered samples corresponding to the first set of samples.

5. The apparatus of claim 4, wherein, according to the position-dependent filter strength, stronger filtering is applied at a bottom-right part of the current block and weaker filtering being applied to a left or top part of the current block.

6. The apparatus of claim 4, wherein the filtering parameter σ is different at different sample positions in the current block.

7. A method for encoding a video signal comprising:

reconstructing a plurality of samples in a current block of samples;

applying a transform to a first set of samples, including at least a subset of the reconstructed samples in the current block and at least one reconstructed sample outside the current block, to generate a set of spectrum components;

applying a filter to at least one of the spectrum components to generate a set of filtered spectrum components, wherein applying a filter to at least one of the Hadamard spectrum components comprises determining $$F(i,\sigma)=\frac{R(i)^2}{R(i)^2+m*\sigma^2}*R(i)$$

where R(i) is a Hadamard spectrum component and F(i, σ) is the corresponding filtered Hadamard spectrum component, m is a normalization constant, and σ is a filtering parameter, wherein the product m*$\sigma^2$ is different at different sample positions in the current block such that a strength of the filter is position-dependent, and wherein the normalization constant m is different at different sample positions in the current block; and applying an inverse of the transform to the filtered spectrum components to generate a plurality of filtered samples corresponding to the first set of samples.

8. The method of claim 7, wherein, according to the position-dependent filter strength, stronger filtering is applied at a bottom-right part of the current block and weaker filtering being applied to a left or top part of the current block.

9. The method of claim 7, wherein the filtering parameter σ is different at different sample positions in the current block.

10. An apparatus for encoding a video signal, the apparatus comprising one or more processors configured to perform:

reconstructing a plurality of samples in a current block of samples;

applying a transform to a first set of samples, including at least a subset of the reconstructed samples in the current block and at least one reconstructed sample outside the current block, to generate a set of spectrum components;

applying a filter to at least one of the spectrum components to generate a set of filtered spectrum components, wherein applying a filter to at least one of the Hadamard spectrum components comprises determining $$F(i, \sigma) = \frac{R(i)^2}{R(i)^2 + m * \sigma^2} * R(i)$$

where R(i) is a Hadamard spectrum component and F(i, σ) is the corresponding filtered Hadamard spectrum component, m is a normalization constant, and σ is a filtering parameter, wherein the product m*$\sigma^2$ is different at different sample positions in the current block such that a strength of the filter is position-dependent, and wherein the normalization constant m is different at different sample positions in the current block; and applying an inverse of the transform to the filtered spectrum components to generate a plurality of filtered samples corresponding to the first set of samples.

11. The apparatus of claim 10, wherein, according to the position-dependent filter strength, stronger filtering is applied at a bottom-right part of the current block and weaker filtering being applied to a left or top part of the current block.

12. The apparatus of claim 10, wherein the filtering parameter σ is different at different sample positions in the current block.

* * * * *